June 24, 1930. A. GRAF 1,766,508
BAKER'S PAN
Filed Oct. 25, 1928
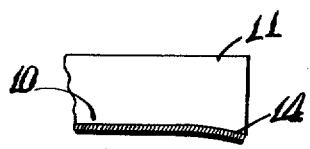
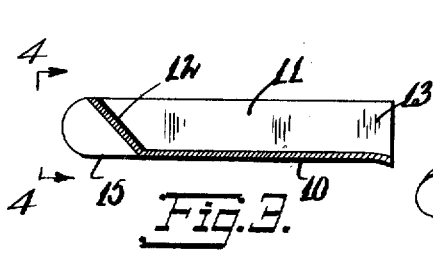
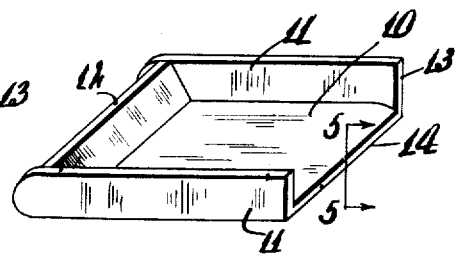
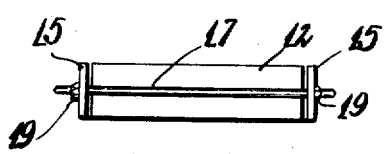
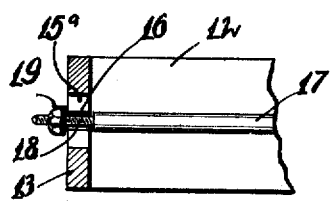
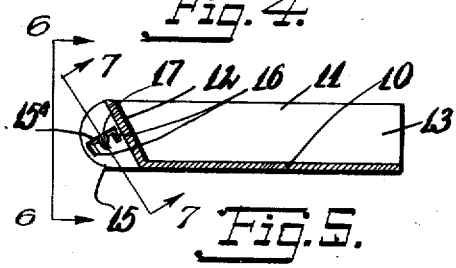
INVENTOR.
Alfons Graf
BY
ATTORNEY Patented June 24, 1930

1,766,508

UNITED STATES PATENT OFFICE

ALFONS GRAF, OF NEW YORK, N. Y.

BAKER'S PAN

Application filed October 25, 1928. Serial No. 315,024.

This invention relates generally to utensils and has more particular reference to a novel baker's pan.

The invention has for an object the provision of an article of the class mentioned which is of simple durable construction, desirable in use and efficient in action, and which can be manufactured and sold at a reasonable cost.

The invention proposes the use of a baker's pan having an opened end and an opposite inclined closed end. This is of particular advantage when the pan is engaged in a cleaning machine for automatically cleaning the same after it has been used. The roller brushes of the machine may readily enter the opened end of the pan and the inclined closed end serves to raise the brushes to allow the pan to pass.

For further comprehension of the invention, and of the objects and advantages thereof, reference will be had to the following description and accompanying drawings, and to the appended claims in which the various novel features of the invention are more particularly set forth.

In the accompanying drawing, forming a material part of this disclosure:—

Fig. 1 is a perspective view of an article constructed according to this invention.

Fig. 2 is a fragmentary vertical sectional view taken on the line 2—2 of Fig. 1.

Fig. 3 is a vertical longitudinal sectional view of Fig. 1.

Fig. 4 is an end view of the article illustrated in Fig. 3 looking in the direction of the line 4—4 but showing the inclined closed end of exaggerated reduced length to bring out that it is not connected with the sides of the device.

Fig. 5 is a view similar to Fig. 3 but illustrating a modification thereof.

Fig. 6 is an end view looking in the direction of the line 6—6 of Fig. 5 but showing the inclined closed end of exaggerated reduced length to bring out that it is not connected with the sides of the device.

Fig. 7 is a fragmentary vertical sectional view, taken on the line 7—7 of Fig. 5.

The reference numeral 10 indicates generally the base of a baker's pan having vertical sides 11 and a closed end 12 disposed of an inclination. The end of the pan opposite this closed end is opened as indicated by numeral 13. This pan is shown of one integral piece of material, but this is not intended as a limitation. The same may be made of several pieces of material suitably fastened together.

The base 10 has been illustrated with a turned down edge 14 at the opened end 13 of the pan. This turned down edge serves for gripping the conveying belt of a cleaning machine adapted for cleaning the pan. In addition, the cleaning brush of this machine may readily enter upon the base by reason of being guided up by the curved front end 14. The sides 11 project past the inclined end 12 and are adjacent its opposite ends, but not connected so that the end 12 may be bent downwards.

The sides 11 have end extensions 15 projecting past the inclined end 12. The inclined end 12 is integral with the base 10 but merely rests against the sides 11. When a pan, constructed according to this form is passed thru the cleaning machine the inclined end 12 may bend downwards for allowing the cleaning brush to pass out of the pan after the cleaning operation. The material from which the pan is made is quite springy so that the inclined end returns back to its original position.

In the modified form illustrated in Figs. 5, 6, and 7, the end extensions 15 are provided with slots 15ª at substantial right angles to the plane of the closed end 12 and a plurality of transverse slots 16 communicate with these main slots. A cross bar 17 has reduced ends 18 engaged in one of the transverse slots 16. Nuts 19 engage on the reduced ends of the bar 17 and serve for holding the bar against motion. It is pointed out that the bar 17 acts as a stop for preventing the closed end 12 from being moved too far downwards so as to pass its elastic limit. The nuts 19 may be loosened and the bar 17 moved into the slots 15, then move along this slot and next engage in a different slot extension 16 for changing its position and the stop action.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A baker's pan, comprising a base portion formed with an upwardly inclined free end portion and vertical sides with end extensions adjacent said end portion, and the said end portion being bendable downwards to various positions and in all positions disposed between said end extensions.

2. A baker's pan, comprising a base portion formed with an upwardly inclined free end portion and vertical sides with end extensions adjacent said end portion, the said end portion being bendable downwards to various positions and in all positions disposed between said end extensions, and means for preventing excessive bending downwards of the inclined end portion.

In testimony whereof I have affixed my signature.

ALFONS GRAF.